6609X
J. Tees,
Wood Planing Machine.
Patented June 13, 1831.
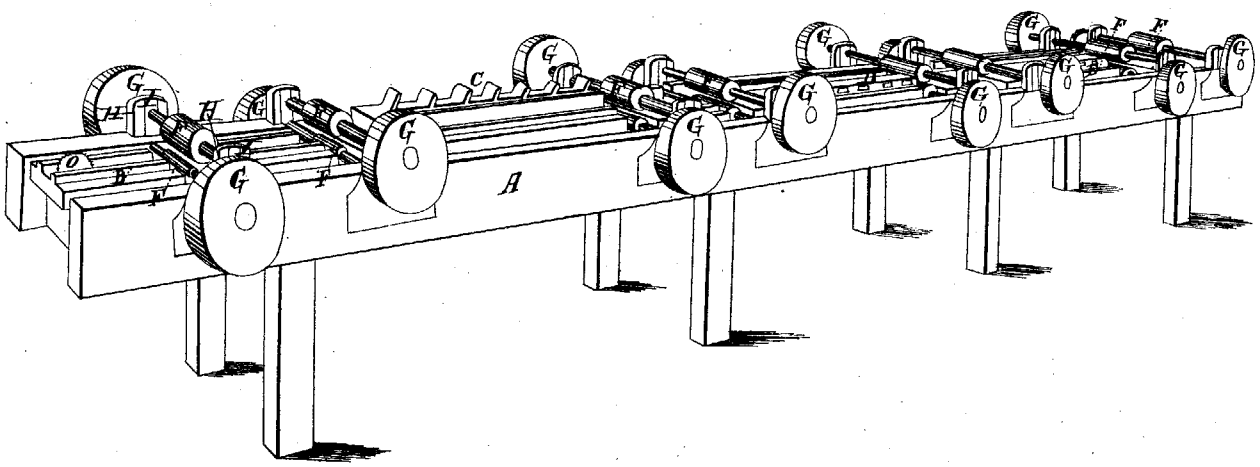
AM. PHOTO-LITHO. CO. N.Y. (OSBORNE'S PROCESS)

6609X

Jacob Tees,

Letters Patent.

The Schedule, referred to in these Letters Patent and making part of the same, containing a description in the words of the said Jacob Tees himself, of his Improvement in the machine for planing edging and grooving boards.

The bench upon which the planes are to be placed should be long enough to admit of three planes being placed upon it, longitudinally succeeding each other with sufficient space at each end and between each plane or set of planes for friction rollers with drums. It is required to be as much wider than the board to be planed, as will admit of securing the battens and plane No. 1, and the planes No. 2 & 3, and the pedestals and boxes for the journals of the friction rollers. Upon the end of the bench where the planing is to be commenced and extending thence the distance of the position of the two first sets of friction rollers, the length of the plane No. 1, and the distance of the position of the two second sets of friction rollers and ending at the fore ends of the planes No. 2, place parallel to each other and the distance apart of the ~~of~~ the width of the board to be planed two battens or guides for the board to be planed. Plane No. 1, may be made in the ordinary way as regards its box, that is to say, that it may be made entirely of wood or its face may be shod or faced with iron or other Metal. It should be long enough to admit of a number (say [illegible]) of plane irons being placed, in succession in it. The plane irons must be as wide as the board to be planed. This plane is laid nearly horizontally, with its edges respectively resting upon the battens its fore part nearest to the end of the bench where the work is to be commenced, and raised, as much higher than the after end, as the thickness of the shaving required to be taken from the board. It it It is prevented from rising too much by weights or springs and
from moving longitudinally or latterally by stops. The boxes of the
planes No. 2. (which are two in number) may be made in like
manner; they must be furnished, respectively, with a number,
(say seven or more) of plane irons placed in succession; but these
plane irons need be of no greater width than the edges of the
board to be planed. These two planes are to be laid upon the
bench upon their sides nearly parallel to each other. Their fore
ends as much more distant from each other than the after
ends as the thickness of the shaving required to be taken off the
edges of the board. The fore ends of these planes must be such
a distance from the after end of the plane No. 1, as will leave
a space for two sets of friction rollers, the faces of these
planes forming respectively lines with the battens or guides
and they (said planes No. 2) being of course as wide apart as
the board required to be planed. The boxes of planes No. 3)
which are also two in number) may be made in like manner,
they must be furnished respectively with a number (say
seven or more) of plane irons placed in succession; but all
the plane irons of one of these planes must be plough, and all
the plane irons of the other of these planes must be groove
irons. They must be of a width sufficient to plough and groove
a board of the thickness required to be planed and ploughed
and grooved. At each end of the bench and also between the
after end of plane No 1. and the fore end of planes No 2,
and likewise between the after end of planes No. 2, and the
fore end of planes No. 3. place respectively two pairs of
friction rollers with drums. The friction rollers are placed
across the bench and the drums revolve outside of the bench.
The journals of the friction rollers should run in boxes
placed in pedestals, let into and secured to the bench.
The rollers may be kept in their places, and may be furnish
ed with sufficient power to gripe and move the board
to be 6609X June 13, 1831 to be planed, by weights or springs. The planes and irons are stationary the moving power is applied to the drums and from through them to the rollers, which rollers gripe the board in succession and pass it under plane No 1, and between planes No. 2, and planes No 3, successively. Upon the end of the bench where the work is commenced on a line with one of the battens may be placed a revolving circular saw to revolve in the same direction as the rollers and deriving its power from the drums. Instead of both battens and both planes of each set being stationary upon the bench, one batten and one of each set of planes, on the same side, may be moveable and may be furnished with registers so that the distance of the battens and planes of a set respectively may be increased or diminished so as to admit boards of different sizes.

Witnesses

Peter A. Browne

John Binns.

Jacob Tees

Operation.

The board to be planed is presented horizontally, and foremost, and with the side intended to be planed uppermost, to the end of the bench where the planing is to be commenced. The end of the board is shoved by hand between the battens or guides until it arrives at the first set of friction rollers which immediately gripe the board and draw it forward; the second set of friction rollers as soon as the end of the board arrives at them gripe it and assist in the horizontal forward moving operation. The board thus passes under plane No 1. and has its upper surface planed smooth by the successive operations of the plane irons of plane No 1.; Should the board be too wide the circular saw cuts it to the width required. Having passed plane No 1, the board passes between the two sets of rollers which are situate between the after end of plane No 1, and the fore end of planes No 2, and by the operation of the plane irons 6609X June 13, 1831 plane irons of planes No 2, has its edges planed straight, having passed planes No 2, the board passes in like manner between the rollers that are situate between the after end of planes No 2, and the fore end of planes No 3, and between planes No 3, by which last operation the board is ploughed on one edge and grooved on the other. It then passes through the remaining sets of rollers which draw the board out and deliver it planed, straightened on the edges and ploughed and grooved.

What the said Jacob Tees claims as his invention are, First. The affixing a number of stationary plane irons in one box or plane. Second the operation of planing with stationary plane irons and stationary planes, to smooth, straighten, and plough and groove a board. Third. The affixing of the circular saw to move with the same power as the planes trimming the board to the proper size to pass between the bottom and planes No 2. and No 3. Fourth, The combination of smoothing, edging and ploughing and grooving the board by one operation by means of stationary planes and plane Irons.

Eng'd [illegible]

Witnesses
Peter A. Browne
John Binns

Jacob Tees (1332 Words)